(12) United States Patent
Eagen et al.

(10) Patent No.: US 7,353,088 B2
(45) Date of Patent: Apr. 1, 2008

(54) SYSTEM AND METHOD FOR DETECTING PRESENCE OF A HUMAN IN A VEHICLE

(75) Inventors: Charles Eagen, Ann Arbor, MI (US); Lee Feldkamp, Plymouth, MI (US); Sam Ebenstein, Southfield, MI (US); Kwaku Prakah-Asante, Commerce Township, MI (US); Yelena Rodin, Southfield, MI (US); Greg Smith, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 698 days.

(21) Appl. No.: 10/904,124

(22) Filed: Oct. 25, 2004

(65) Prior Publication Data

US 2006/0089753 A1   Apr. 27, 2006

(51) Int. Cl.
 *B60R 21/015* (2006.01)
 *G08B 23/00* (2006.01)
 *G06F 19/00* (2006.01)

(52) U.S. Cl. .............................. 701/1; 701/35; 701/45; 706/15; 706/30; 702/56

(58) Field of Classification Search .................... 701/1, 701/29, 35, 45, 46; 706/23, 15, 20, 30; 702/54, 702/56; 180/272; 700/279
 See application file for complete search history.

(56) References Cited

U.S. PATENT DOCUMENTS

| | | | | |
|---|---|---|---|---|
| 5,182,794 A | * | 1/1993 | Gasperi et al. ............... 706/25 |
| 5,228,113 A | * | 7/1993 | Shelton ........................ 706/25 |
| 5,671,336 A | * | 9/1997 | Yoshida et al. ............... 706/30 |
| 5,684,701 A | * | 11/1997 | Breed ........................... 701/45 |
| 5,828,812 A | * | 10/1998 | Khan et al. ..................... 706/2 |
| 6,078,854 A | | 6/2000 | Breed et al. |
| 6,474,683 B1 | | 11/2002 | Breed et al. |
| 2001/0042977 A1 | | 11/2001 | Breed et al. |
| 2002/0145516 A1 | | 10/2002 | Moskowitz et al. |
| 2002/0163426 A1 | | 11/2002 | Moskowitz |

(Continued)

OTHER PUBLICATIONS

Lee A. Feldkamp and Gintaras V. Puskorius, article entitled "A Signal Processing Framework Based on Dynamic Neural Networks with Application to Problems in Adaptation, Filtering and Classification", 23 pages, Proceedings of the IEEE, vol. 86, No. 11, 1998.

*Primary Examiner*—Tan Nguyen
(74) *Attorney, Agent, or Firm*—Frank A. MacKenzie; Brooks Kushman P.C.

(57) ABSTRACT

A system for detecting the presence of a human in a vehicle is provided. The system includes a vibration sensor that is configured to detect vibrations of the vehicle, and to output signals related to the sensed vibrations. A processor is configured to receive the signals output from the vibration sensor. The processor also operates a neural network that has a plurality of nodes, at least some of which are recurrent. The use of the recurrent nodes allows the output of a recurrent node to be fed back into itself, or another node. In addition, the output that is fed back can be combined with other inputs entering the node. In this way, the neural network can quickly learn to distinguish between various conditions, including an occupied state and an unoccupied state of the vehicle. The neural network provides an output indicating whether the vehicle is occupied.

22 Claims, 3 Drawing Sheets

U.S. PATENT DOCUMENTS

| | | |
|---|---|---|
| 2002/0188392 A1 | 12/2002 | Breed et al. |
| 2003/0002690 A1 | 1/2003 | Breed et al. |
| 2003/0036835 A1 | 2/2003 | Breed et al. |
| 2003/0136600 A1 | 7/2003 | Breed et al. |
| 2003/0154009 A1 | 8/2003 | Basir et al. |
| 2003/0201894 A1 | 10/2003 | Li |
| 2004/0039509 A1 | 2/2004 | Breed |
| 2005/0149234 A1* | 7/2005 | Vian et al. .................. 700/279 |

* cited by examiner

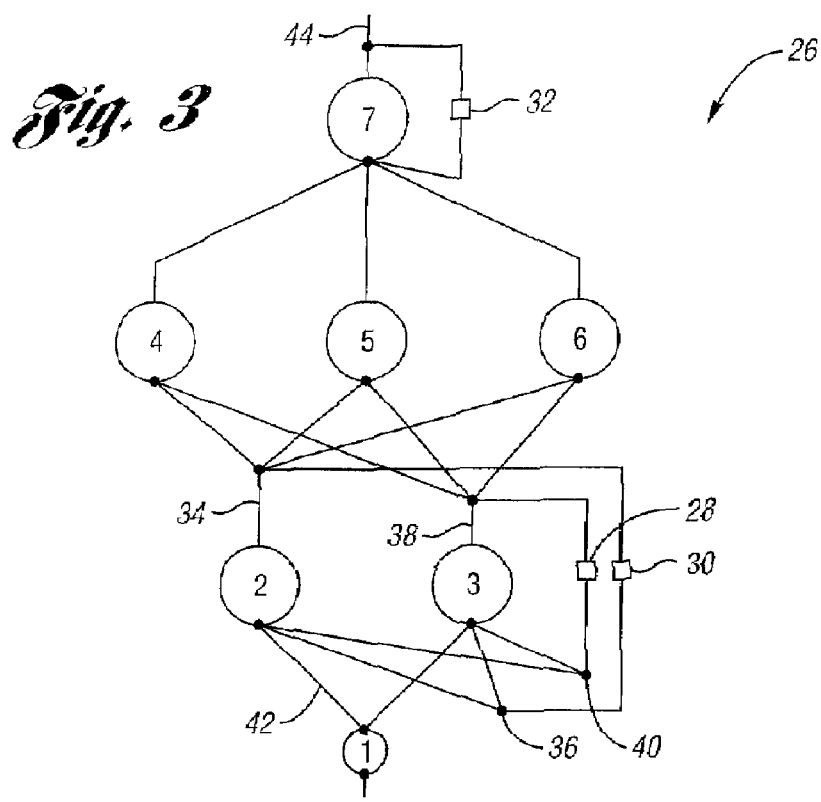
Fig. 3
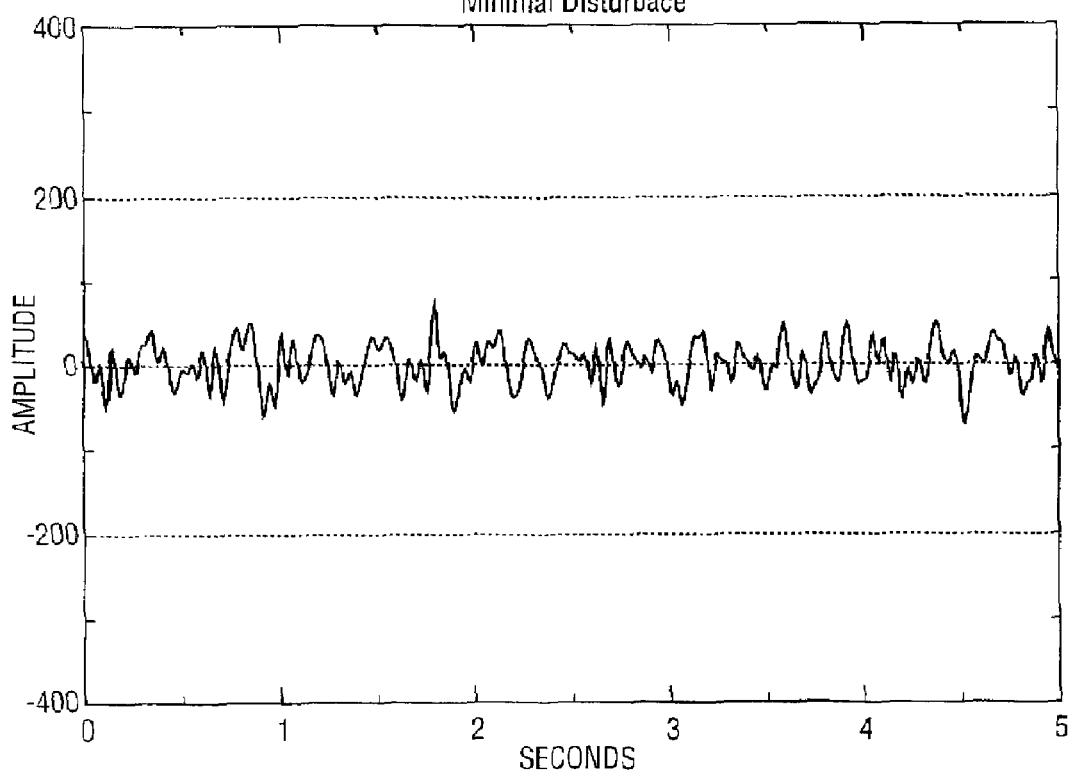
Fig. 4 EMPTY Minimal Disturbace

SYSTEM AND METHOD FOR DETECTING PRESENCE OF A HUMAN IN A VEHICLE

BACKGROUND OF THE INVENTION

1. Field of the Invention

The present invention relates to a system and method for detecting presence of a human in a vehicle, and a vehicle containing such a system.

2. Background Art

When a driver returns to his or her vehicle at night, particularly in a deserted location, the knowledge that no one is hiding inside the vehicle can provide peace of mind. In many cases, the ability to reliably detect the presence of a person inside a parked vehicle is desirable. Detecting the presence of a vehicle occupant is a process that has been used for some time at border crossings, or at the entrance to, or exit from, a secure site. In these cases, sensitive vibration sensors are often used to "listen" for the telltale vibrations of occupants hidden in a vehicle.

A method of computer processing the sensor outputs was developed at Oak Ridge National Laboratories, and was applied to screening vehicles entering and leaving nuclear sites and prison facilities. The systems developed by Oak Ridge National Laboratories used multiple geophones on the vehicle, and tested for 10-20 seconds, looking for the characteristic acoustic wave generated by a heartbeat. Such systems were designed to give no false negatives—i.e., reporting the vehicle unoccupied when someone is actually in it—at the expense of having some false positives—i.e., reporting the vehicle occupied when no one is actually in it. In particular, these systems can be sensitive to false positives in windy conditions.

In addition to the systems used at border crossings and other secure sites, human detection systems have also been used as part of various other vehicle systems, such as controlling an occupant restraint system. One such method and apparatus is described in U.S. Patent Application Publication No. 2004/0039509, applied for by Breed, and published on Feb. 26, 2004. The method and apparatus described in Breed senses the occupancy of a vehicle using various sensors. In order to differentiate between different occupant conditions—e.g., a rear-facing child seat and a forward-facing occupant—a neural network is trained under a variety of experimental conditions so that the system can differentiate between the different conditions when the system is operating. In fact, Breed notes that as many as 1,000,000 experiments may need to be run before the network is sufficiently trained.

One limitation of the method and apparatus described in Breed is that the neural network includes feedforward nodes that do not exhibit state. In contrast, the use of a neural network having at least some recurrent nodes may provide a number of advantages. For example, having recurrent nodes provides a means for directing output from a node back into itself. This can increase the accuracy of the output, and greatly speed the learning process of the network, thereby significantly reducing the number of experiments required before the network can be operated. In addition, having a neural network that utilizes recurrent nodes can provide a time delay between the output from one of the recurrent nodes and its input back into itself, or its input into another node. This allows the multiple inputs into a node to be combined prior to being processed by the node. This also can greatly increase the speed at which the network is trained and increase the accuracy of the output.

SUMMARY OF THE INVENTION

Accordingly, one advantage of the present invention is that it provides a system for detecting the presence of a human in a vehicle using a neural network having at least one recurrent node. This speeds the process by which the network is trained to differentiate between various vehicle conditions.

Another advantage of the present invention is that it provides a vehicle which can utilize a single vibration sensor in concert with a neural network having at least one recurrent node that can feed its output back into itself or other nodes in the network, thereby providing a mechanism for mathematically combining inputs into the nodes.

The invention also provides a system for detecting the presence of a human in a vehicle. The system includes a vibration sensor configured to detect vibration of the vehicle and to output signals related to the sensed vibrations. A processor is configured to receive the signals output from the vibration sensor. A neural network run by the processor has a plurality of nodes, at least one of which is a recurrent node. This facilitates operation of the neural network using a time delay between an output from a recurrent node and its input into another of the nodes in the network, or back into itself. The neural network is configured to provide at least one output value indicating that a human is present in the vehicle and at least one output value indicating that a human is not present in the vehicle.

The invention further provides a vehicle including a system for detecting the presence of a human in the vehicle. The vehicle includes a vibration sensor mounted on a portion of the vehicle for detecting vibrations of the vehicle and for outputting signals related to the sensed vibrations. A processor is configured to receive the signals output from the vibration sensor. A neural network is run by the processor, and has a plurality of nodes, at least one of which is a recurrent node. This facilitates operation of the neural network using a time delay between an output from a recurrent node and its input, back into itself, or into another of the nodes. The neural network is configured to provide at least one output value indicating that a human is present in the vehicle and at least one output value indicating that a human is not present in the vehicle.

The invention also provides a method for detecting the presence of a human in a vehicle. The method includes sensing vibrations in the vehicle, outputting signals related to the sensed vibrations, and processing the signals using a neural network. The neural network has a plurality of nodes, at least one of which is a recurrent node. This facilitates operation of the neural network using a time delay between an output from a recurrent node and its input into another of the nodes or back into itself. A signal is output from the neural network indicating whether a human is present in the vehicle.

BRIEF DESCRIPTION OF THE DRAWINGS

FIG. 3 is a schematic representation of a neural network in accordance with the present invention, including a number of recurrent nodes;

FIG. 4 is a plot of a vibration signal generated by sensing vibrations in an empty vehicle having a minimum of external forces applied to it;

DETAILED DESCRIPTION OF THE PREFERRED EMBODIMENT(S)

Figure 1:
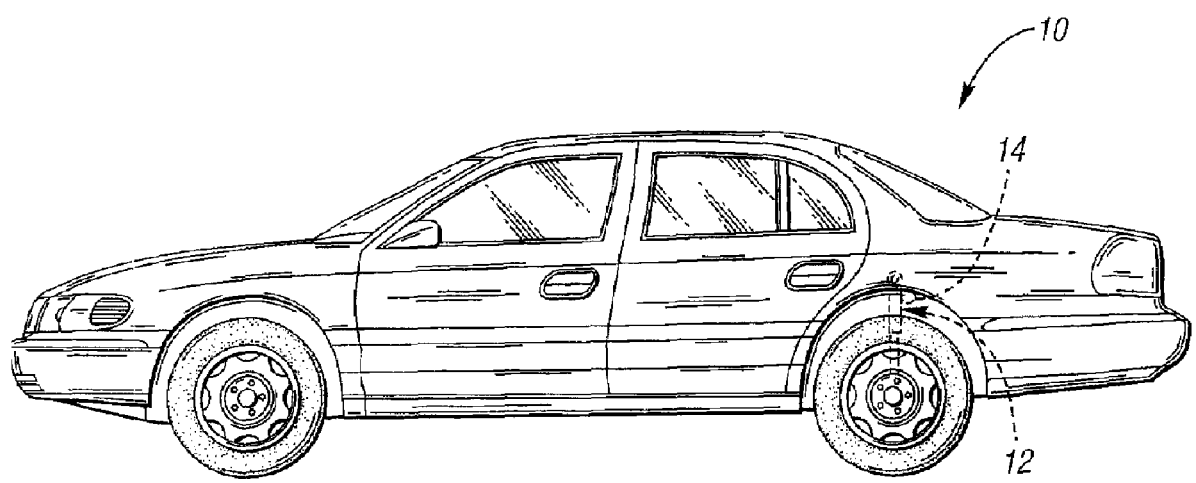
FIG. 1 is a side view of a vehicle 10, including a portion of a suspension system and a vibration sensor.

FIG. 1 shows a vehicle 10 in accordance with the present invention. Also illustrated in FIG. 1 are a portion of a suspension system 12, and a vibration sensor 14 disposed on, and configured to detect vibrations of, the suspension system 12. The vibration sensor 14, shown in FIG. 1, is a micro-accelerometer which is a relatively low cost and rugged device. The sensor 14 is sensitive to vibrations in the frequency range 1-20 Hertz (Hz). In addition, the sensor 14 is able to detect accelerations down to 5 µg.

It is worth noting that the present invention contemplates the use of other types of sensors, including different types of acceleration sensors or velocity sensors. In fact, virtually any such sensor can be used if it has a sufficient signal-to-noise ratio and a frequency response within the desired range. As illustrated in FIG. 1, the sensor 14 is connected directly to a portion of the suspension system 12. Alternatively, a sensor, such as a sensor 14, can be placed in other locations within the vehicle 10, provided it is effective to pick up vibrations required to detect the presence of a human in the vehicle 10.

Figure 2:
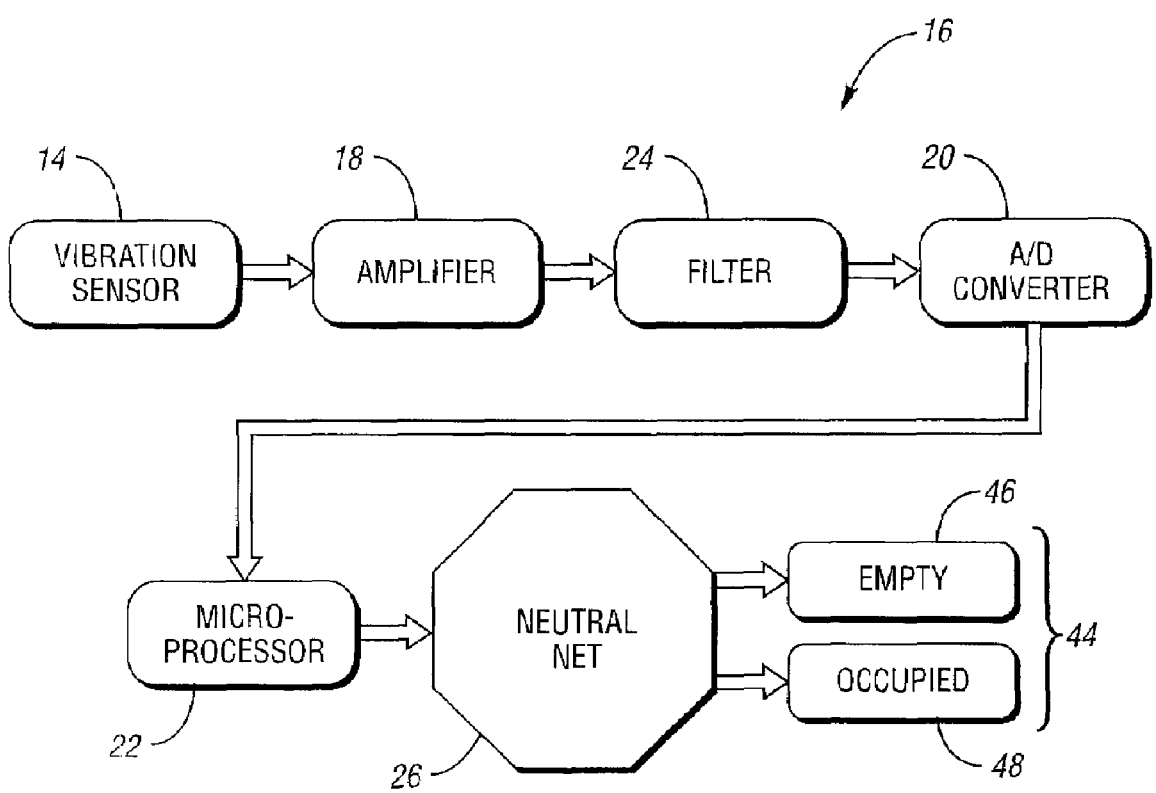
FIG. 2 is a schematic representation of a system in accordance with the present invention.

The sensor 14 is part of a system 16—see FIG. 2—for detecting the presence of a human in the vehicle 10. As discussed above, the sensor 14 senses vibrations in the vehicle through the suspension system 12. The sensor 14 then outputs signals to other portions of the system 16. The signals output by the sensor 14 are first amplified by an amplifier 18. The amplifier 18 amplifies the signals from the sensor 14 to a sufficient level to enable analog-to-digital conversion. That is, the signals output by the sensor 14 are analog signals, which are converted to digital signals by an analog-to-digital (A/D) converter 20, for use by a processor, or microprocessor 22. The amplifier 18, shown in FIG. 2, is a low noise amplifier with a gain of 200. In general, the gain of an amplifier used in a system, such as the system 16, is chosen based on the sensitivity of the sensor, the reference voltage of the A/D converter, and the resolution of the A/D converter.

After the gain is applied to the signals output by the sensor 14, the signals are passed through a filter 24. Because the system 16 is configured to detect the presence of a human in the vehicle 10, of particular interest are the vibrations caused by a human heartbeat. Such vibrations lie within a limited frequency range, and therefore, to avoid swamping the A/D converter 20 with signals outside this range, the low pass filter 24 is used. The filter 24 also acts as an anti-aliasing filter for the A/D conversion. The filter 24, shown in FIG. 2, is a 12 db/octave filter with a 12 Hz corner frequency. In general, however, a filter, such as the filter 24, can be matched with the characteristics of the vibration sensor to enable the use of a less complex, lower cost filter.

In summary, the sensor 14 detects vibrations of the vehicle 10, and outputs signals related to the sensed vibrations to the microprocessor 22. Before the microprocessor 22 receives the signals, a gain is applied by the amplifier 18, and the filter 24 filters out signals that are outside a predetermined frequency range; this limits the frequency range of the signals received by the microprocessor 22. The microprocessor 22 runs a neural network 26, illustrated in more detail in FIG. 3.

As shown in FIG. 3, the neural network 26 includes a plurality of nodes, labeled 1-7. Unlike some neural networks, which include only feedforward nodes, the neural network 26 includes a number of recurrent nodes. Specifically, nodes 2, 3 and 7 are recurrent. Having recurrent nodes in a neural network, such as the network 26, allows the output from the recurrent node to be fed back into itself, or another node. The small boxes 28, 30, 32, shown in FIG. 3, represent a time delay between the output of a node and the input into another node or itself. For example, the output 34 of node 2 has a time delay applied to it, represented by the small box 30. The output 34 is split at a junction 36, such that the output 34 from node 2 is fed back into node 2, and is also fed into node 3.

Another example of how outputs of recurrent nodes are fed back into themselves, or other nodes, is shown with reference to node 3. The output 38 of node 3 has a time delay applied to it, represented by the small box 28. The output 38 is then split at a junction 40, such that the output 38 is fed back into node 3, and is also fed into node 2, where it combines with the time delayed output 34 from node 2 and the output 42 from node 1.

Thus, the use of recurrent nodes facilitates operation of the neural network 26 using a time delay between an output from a recurrent node and its subsequent input into itself or another node. An in depth treatment of neural networks using time delayed recurrent nodes can be found in the paper entitled "A Signal Processing Framework Based On Dynamic Neural Networks With Application To Problems In Adaptation, Filtering, And Classification," by Feldkamp & Puskorius, from Proceedings of the IEEE, November 1998, volume 86, issue 11, pages 2259-2277, which is incorporated in its entirety herein by reference.

One advantage of having recurrent nodes in a neural network, such as the network 26, is that the use of recurrent nodes greatly speeds the process of training the neural network to distinguish between various conditions. For example, the vehicle 10 may be subject to a wide variety of external forces, completely unrelated to whether the vehicle 10 is occupied. Therefore, merely examining the amplitude of the vibration signals from the sensor 14 may not be enough for an accurate determination of whether the vehicle 10 is occupied. Therefore, the neural network 26 is trained under a variety of controlled conditions to account for the effects of various external forces.

For each of these cases, the neural network 26 is trained when the vehicle is occupied, and when it is unoccupied. For example, the vehicle 10 may be placed in controlled conditions such as parked on a quiet street, parked on a noisy street, and/or subject to a variety of different environmental conditions, such as a moderate wind, or a high wind. In addition, certain vehicle conditions can be controlled, such as the air pressure in the tires. Other conditions may include: having different occupants in the vehicle for all or some of these different conditions, having different numbers of occupants in the vehicle, and/or having occupants in different positions within the vehicle. This allows a neural network, such as the network 26, to distinguish between an occupied and an unoccupied vehicle, regardless of the external forces experienced by the vehicle.

Having the recurrent nodes 2, 3 and 7 in the neural network 26, reduces the number of experiments, and thus the overall teaching time, for the network 26. Recurrent nodes, such as the nodes 2, 3 and 7, exhibit state. That is, the outputs of the recurrent nodes 2, 3 and 7 are used as inputs for themselves and other nodes. In this way, various inputs into the recurrent nodes can be mathematically combined to generate a more accurate output. For example, the output 42 from node 1 is combined with the previous output 34 from node 2, and the output 38 from node 3. Moreover, the output 38 from node 3 is also, in part, a function of the output 34 from node 2. When a recurrent node, such as the node 2, is provided with multiple inputs, they may be mathematically combined—e.g., averaged—to provide a more accurate input into the recurrent node, thereby facilitating the generation of a more accurate output.

The node 7, shown in FIG. 3, is also a recurrent node, and provides the final system output 44. The system 16 has a single output 44, but the output 44 may have any of a number of different values. For example, as illustrated in FIG. 2, the output 44 may have a value indicating an "empty" condition 46, or it may have a value indicating an "occupied" condition 48. In one embodiment, the neural network 26 would output a positive one (+1) if the vehicle is occupied, a negative one (−1) if the vehicle is unoccupied, and a zero (0) if the neural network 26 is uncertain as to the presence of a human in the vehicle 10. Even the knowledge that the neural network 26 is uncertain as to the presence of a human in the vehicle 10 can be useful, particularly when such output is used in conjunction with other systems.

The network 26 can be configured to provide outputs that are anywhere within a predetermined range. For example, the neural network 26 may be configured to output any value between negative one and positive one. In such a case, the determination of whether the vehicle 10 is occupied, unoccupied, or whether the neural network 26 is uncertain, would be based on whether the output value is closest to positive one, negative one, or zero, respectively.

The determination of the status of the vehicle 10 can be biased toward one end of the range or the other. For example, if it is desired to have a very high probability that the system 16 will detect all instances when the vehicle 10 is occupied, an occupied state can be defined as an output value of (−0.5) to (1.0)—this is 75% of the total range. Alternatively, an occupied state can be defined over other portions of the total range—e.g., an output value of (0.5) to (1.0) indicating an occupied state. In the latter example, an unoccupied state may be defined as an output value of (−1.0) to (−0.5), with any value between (−0.5) and (0.5) indicating that the neural network 26 is uncertain as to the occupancy of the vehicle 10. How the states are defined may depend on such factors as whether the user prefers false positive outcomes or false negative outcomes.

Figure 5:
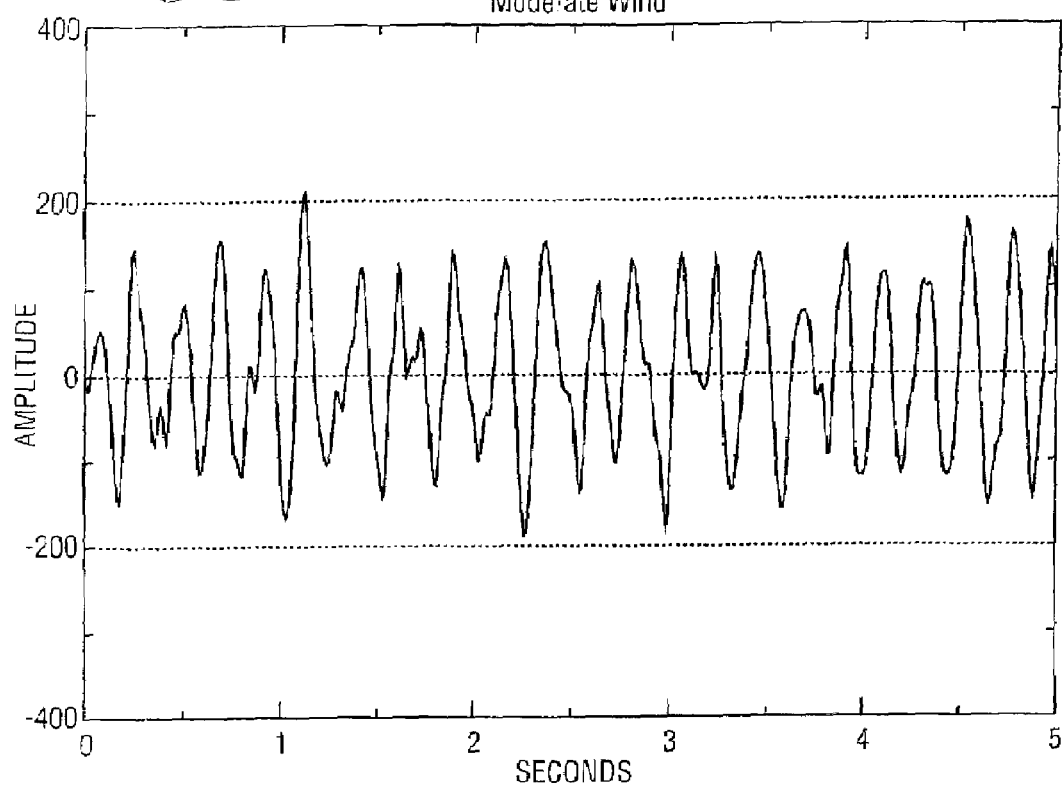
FIG. 5 is a plot of a vibration signal generated by sensing vibrations in an empty vehicle exposed to a moderate wind.
Figure 6:
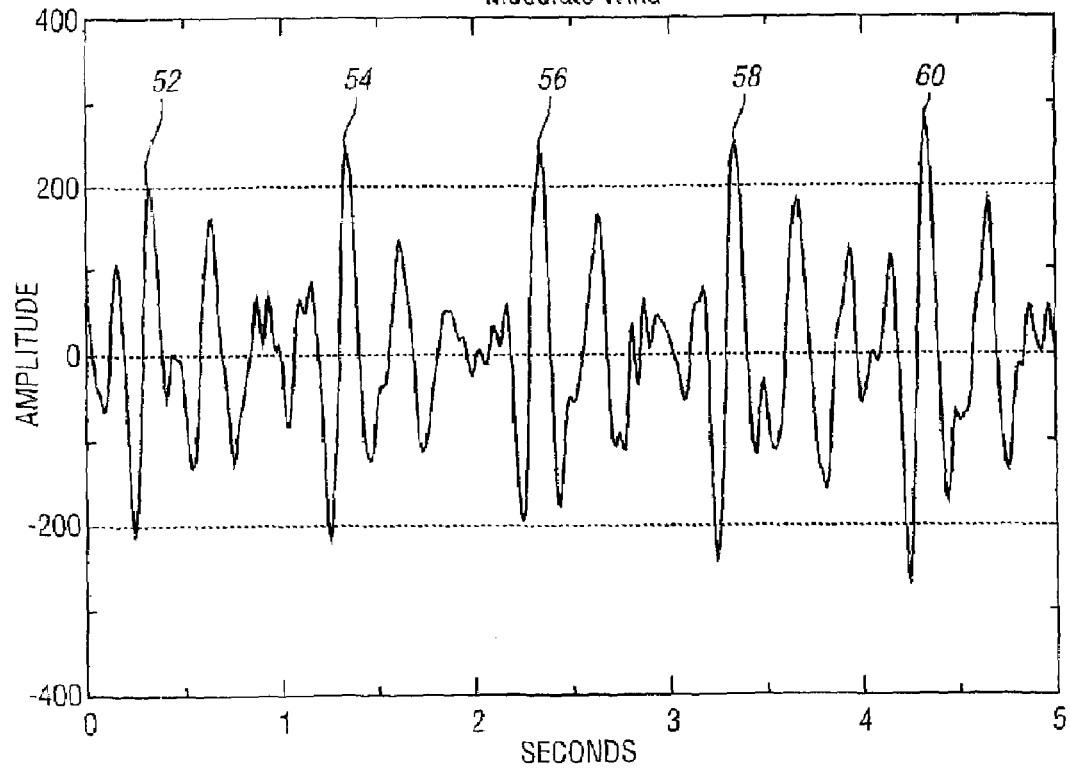
FIG. 6 is a plot of a vibration signal generated by sensing vibrations in an occupied vehicle exposed to a moderate wind.

FIGS. 4-6 illustrate plots of signals that may be received by the microprocessor 22 under a variety of different conditions. For example, FIG. 4 shows a plot of a vibration signal when the vehicle 10 is empty, and there is a minimum of external disturbance on the vehicle 10. As shown in FIG. 4, the plot is in a time domain over a range of five seconds. The amplitude of the signal is presented on the ordinate, and may be given in any convenient units. As understood by those familiar with signal processing, the amplitude is directly related to the voltage of the signal output by the sensor 14. As shown in FIG. 4, the peak-to-peak amplitudes of the signal are relatively low. This is consistent with what may be expected for an empty vehicle experiencing a minimum of external forces.

In contrast to FIG. 4, FIG. 5 shows the same vehicle, although still unoccupied, being subjected to a moderate wind. As readily seen in FIG. 5, the peak-to-peak amplitudes of the signal are much greater than those of FIG. 4. This is again consistent with what may be expected when the vehicle 10 is subjected to a greater external force. In some cases, the presence of a human in a vehicle can cause an increase in the amplitude of the signal from a sensor, such as the sensor 14. In these cases, the amplitude of the signal—i.e., its magnitude—may be used as the basis for the neural network to distinguish between an occupied and an unoccupied state. There are other situations, however, when the presence of a human in the vehicle does not appreciably increase the magnitude of the signals output from the sensor.

This concept is illustrated in FIG. 6, which shows the signal output from the sensor 14 when the vehicle 10 is occupied and subjected to a moderate wind. Thus, FIGS. 5 and 6 were generated when the vehicle 10 was subject to "the same" external forces, with the only difference being that the vehicle was unoccupied when the signal shown in FIG. 5 was generated, and the vehicle was occupied when the signal shown in FIG. 6 was generated. Although there are some discernable differences between the outputs shown in FIGS. 5 and 6, the average magnitude of each of the signals is very close to the other. Therefore, it is not possible to use magnitude alone to differentiate between an occupied state and an unoccupied state. In such a case, the neural network 26 examines the shape of the signal and compares this to the shapes of signals generated during the training period. It can then determine if the vehicle is occupied.

The plot shown in FIG. 6 includes five distinct peaks 52, 54, 56, 58, 60. The peaks 52, 54, 56, 58, 60 occur at approximately one second intervals. It is therefore relatively easy to determine from FIG. 6 that each of the peaks 52, 54, 56, 58, 60 represent vibrations in the suspension system 12 caused by a human heartbeat. Thus, the decision is made that the vehicle 10 is occupied. Although the output shown in FIG. 6 provides a visual means by which the human eye can make a determination as to the occupancy of the vehicle 10, in most cases, such a determination is not possible without the use of a neural network, such as the network 26. The neural network 26 is able to process millions of pieces of information in order to make fine distinctions between the shapes of different signals so that it can determine the occupancy of the vehicle 10, where a mere visual inspection would be ineffective.

In summary, a method of the present invention would include sensing vibration in the vehicle 10 using the sensor 14, and outputting signals to the microprocessor 22. The microprocessor 22 would then operate the neural network 26, which would make a determination as to the occupancy of the vehicle 10. As discussed above, the output from the neural network 26 may be in the form of a digit such as positive one or negative one. For purposes of a practical application, the output can be sent to a remote electronic device, such as a cell phone, a palm pilot, or an electronic device on a key fob. The detection of vibration by the sensor 14 may be continuous, such that a signal—e.g., an alarm—is generated to alert a user whenever a human presence is detected in the vehicle 10.

Alternatively, the detection of a human in the vehicle 10 can be on demand. That is, a user may signal the system 16 via an electronic device whenever the user desires information regarding the occupancy of the vehicle 10. Thus, a driver approaching the vehicle 10 may choose to signal the system 16 to generate an output back to the driver to indicate the occupancy of the vehicle, before the driver reaches the vehicle 10. Therefore, there are any number of ways in which the output from a system, such as the system 16, can be used to provide important information to a system user.

While the best mode for carrying out the invention has been described in detail, those familiar with the art to which this invention relates will recognize various alternative designs and embodiments for practicing the invention as defined by the following claims.

What is claimed is:

1. A system for detecting the presence of a human in a vehicle, the system comprising:
    a vibration sensor configured to detect vibrations of the vehicle and to output signals related to the sensed vibrations;
    a processor configured to receive the signals output from the vibration sensor; and
    a neural network run by the processor and having plurality of nodes, at least one of the nodes being a recurrent node, thereby facilitating operation of the neural network using a time delay between an output from a recurrent node and an input, of the recurrent node output, into another of the nodes, and using a time delay between the recurrent node output and an input, of the recurrent node output, back into the recurrent node, the neural network being configured to provide at least one output value indicating that a human is present in the vehicle and at least one output value indicating that a human is not present in the vehicle.

2. The system of claim 1, wherein the neural network can be operated such that the recurrent node output can be directly input back into the recurrent node, and
    wherein the neural network can be operated such that the recurrent node output can be input into another node.

3. The system of claim 1, wherein the output values from the neural network are based on a magnitude of the signals received by the processor.

4. The system of claim 1, wherein the output values from the neural network are based on a shape of the signals received by the processor.

5. The system of claim 1, wherein the signals output from the vibration sensor are analog signals, the system further comprising:
    an amplifier in communication with the vibration sensor and configured to amplify the analog signals output by the vibration sensor; and
    a convertor for converting the amplified signals from an analog format to a digital format before the signals are received by the processor.

6. The system of claim 5, further comprising a filter for filtering out signals outside a predetermined frequency range, thereby limiting the frequency range of the signals received by the processor.

7. The system of claim 1, wherein the neural network is trained to distinguish between a human being present in the vehicle and a human not being present in the vehicle by collecting data from the vibration sensor over a plurality of vehicle conditions.

8. The system of claim 7, wherein the neural network is further configured to provide at least one output value indicating that the neural network is uncertain as to the presence of a human in the vehicle.

9. The system of claim 1, wherein each recurrent node is configured to receive a plurality of inputs and to provide a single output to another node based on the inputs.

10. The system of claim 9, wherein the inputs to each recurrent node are mathematically combined to generate the single output.

11. A vehicle including a system for detecting the presence of a human in the vehicle, the vehicle comprising:
    a vibration sensor disposed on a portion of the vehicle for detecting vibrations of the vehicle and for outputting signals related to the sensed vibrations;
    a processor configured to receive the signals output from the vibration sensor; and
    a neural network run by the processor and having plurality of nodes, at least one of the nodes being a recurrent node, thereby facilitating operation of the neural network using a time delay between an output from a recurrent node and an input, of the recurrent node output, into another of the nodes, and using a time delay between the recurrent node output and an input, of the recurrent node output, back into the recurrent node, the neural network being configured to provide at least one output value indicating that a human is present in the vehicle and at least one output value indicating that a human is not present in the vehicle.

12. The vehicle of claim 11, wherein the neural network can be operated such that the recurrent node output can be directly input back into the recurrent node, and
    wherein the neural network can be operated such that the recurrent node output can be input into another node.

13. The vehicle of claim 11, further comprising a suspension system, and wherein the vibration sensor is disposed on the portion of the vehicle such that the vibration sensor detects vibrations of suspension system.

14. The vehicle of claim 11, wherein the outputs from the neural network are based on at least one of a magnitude of the signals received by the processor and a shape of the signals received by the processor.

15. The vehicle of claim 11, wherein the neural network is trained to distinguish between a human being present in the vehicle and a human not being present in the vehicle by collecting data from the vibration sensor over a plurality of vehicle conditions.

16. The vehicle of claim 15, wherein the neural network is further configured to provide at least one output value indicating that the neural network is uncertain as to the presence of a human in the vehicle.

17. The vehicle of claim 11, wherein each recurrent node is configured to receive a plurality of inputs and to provide a single output to another node based on the inputs.

18. The vehicle of claim 17, wherein the inputs to each recurrent node is mathematically combined to generate the single output.

19. A method for detecting the presence of a human in a vehicle, the method comprising:
    sensing vibrations in the vehicle;
    outputting signals related to the sensed vibrations;
    processing the signals using a neural network having a plurality of nodes, at least one of the nodes being a recurrent node, thereby facilitating operation of the neural network using a time delay between an output from a recurrent node and an input, of the recurrent node output, into another of the nodes, and using a time delay between the recurrent node output and an input, of the recurrent node output, back into the recurrent node; and
    outputting a signal from the neural network indicating whether a human is present in the vehicle.

20. The method of claim 19, wherein the signal output from the neural network indicating whether a human is present in the vehicle is based on at least one of a magnitude of the sensed vibrations and a shape of the sensed vibrations.

21. The method of claim 20, further comprising outputting a signal from the neural network indicating that the neural network is uncertain as to the presence of a human in the vehicle.

22. The method of claim 19, further comprising training the neural network to distinguish between a human being present in the vehicle and a human not being present in the vehicle, the training including sensing vibrations over a plurality of vehicle conditions.

* * * * *